(12) United States Patent
Cellerier et al.

(10) Patent No.: US 12,092,748 B2
(45) Date of Patent: Sep. 17, 2024

(54) SYSTEM AND METHOD FOR LOCATING SUNKEN ELEMENT IN A PREDETERMINED SEARCH ZONE

(71) Applicant: THALES, Courbevoie (FR)

(72) Inventors: Eric Cellerier, Merignac (FR);
Guillaume Dupont, Merignac (FR)

(73) Assignee: THALES, Courbevoie (FR)

( * ) Notice: Subject to any disclaimer, the term of this patent is extended or adjusted under 35 U.S.C. 154(b) by 63 days.

(21) Appl. No.: 17/921,779

(22) PCT Filed: Apr. 28, 2021

(86) PCT No.: PCT/EP2021/061053
§ 371 (c)(1),
(2) Date: Oct. 27, 2022

(87) PCT Pub. No.: WO2021/219684
PCT Pub. Date: Nov. 4, 2021

(65) Prior Publication Data
US 2023/0168332 A1  Jun. 1, 2023

(30) Foreign Application Priority Data

Apr. 28, 2020 (FR) ..................... 20 04192

(51) Int. Cl.
*G08B 1/08* (2006.01)
*B64C 39/02* (2023.01)
(Continued)

(52) U.S. Cl.
CPC .......... *G01S 5/0027* (2013.01); *B64C 39/024* (2013.01); *G05D 1/0291* (2013.01); *B64U 2101/32* (2023.01)

(58) Field of Classification Search
CPC ... G01S 5/0027; B64C 39/024; G05D 1/0291; B64U 2101/32
(Continued)

(56) References Cited

U.S. PATENT DOCUMENTS 5,629,626 A * 5/1997 Russell ............... G01V 3/08
342/357.68
7,355,513 B1 * 4/2008 Brockel ............... G01S 19/17
340/539.11
(Continued)

FOREIGN PATENT DOCUMENTS

EP    2520343     11/2012
WO   2020/064923   4/2020

OTHER PUBLICATIONS

International Search Report for PCT/EP2021/061053, mailed Jun. 29, 2021, 5 pages.
(Continued)

*Primary Examiner* — Tai T Nguyen
(74) *Attorney, Agent, or Firm* — NIXON & VANDERHYE

(57) ABSTRACT

Disclosed is a method for assisting in the location of an engulfed element in a predetermined search zone, implemented by a location assistance system including at least a plurality of patrollers including at least one drone, the method including at least the following steps: arrival of the drone at the predetermined search zone; determination by the drone, of the topography of the predetermined search zone; division of the predetermined search zone into areas, by the drone, depending on the topography and the capabilities of each patroller, and assigning of each area to at least one patroller; searching for the engulfed element in each search zone by the at least one patroller assigned to the
(Continued)

area; and periodic inter-patroller communication at least until the at least one engulfed element is located.

19 Claims, 9 Drawing Sheets

(51) Int. Cl.
*G01S 5/00* (2006.01)
*G05D 1/00* (2006.01)
*B64U 101/32* (2023.01)

(58) Field of Classification Search
USPC .................................................. 340/539.13
See application file for complete search history.

(56) References Cited

U.S. PATENT DOCUMENTS

| 2003/0052823 | A1* | 3/2003 | Carroll ................. G01S 5/0249 |
| | | | 342/465 |
| 2007/0225043 | A1* | 9/2007 | Hieatt, III ............. H04W 16/18 |
| | | | 455/562.1 |
| 2019/0228630 | A1 | 7/2019 | Gillum et al. |
| 2020/0020093 | A1* | 1/2020 | Frei ....................... G05D 1/0038 |
| 2020/0278472 | A1* | 9/2020 | Del Grande ........... G01V 9/005 |

OTHER PUBLICATIONS

Written Opinion of the ISA for PCT/EP2021/061053, mailed Jun. 29, 2021, 7 pages.
Bryant, "An autonomous multi-UAV system for avalanche search", Jul. 3, 2019, pp. 1-51.

\* cited by examiner

SYSTEM AND METHOD FOR LOCATING SUNKEN ELEMENT IN A PREDETERMINED SEARCH ZONE

CROSS-REFERENCE TO RELATED APPLICATIONS

This application is the U.S. national phase of International Application No. PCT/EP2021/061053 filed Apr. 28, 2021, which designated the U.S. and claims priority to FR Patent Application No. 2004192 filed Apr. 28, 2020, the entire contents of each of which are hereby incorporated by reference.

BACKGROUND OF THE INVENTION

Field of the Invention

The present invention relates to a method for assisting in the location of at least one element engulfed within a predetermined search zone, the method being implemented by a system for assisting in the location of at least one element comprising at least a plurality of patrollers.

The invention further relates to a system for assisting in the location of at least one engulfed element within a predetermined search zone, the system comprising at least a plurality of patrollers.

The invention further relates to electronic equipment for assisting in the location of at least one element engulfed within a predetermined search zone, said equipment being suitable for being carried by at least one patroller of the plurality of patrollers of the aforementioned location assistance system.

Description of the Related Art

The invention relates to the field of the location of an engulfed (i.e. disappeared) element the search of which is required or even vital. "Engulfed element" refers to an element which was swallowed up, buried or submerged by the environment and thus invisible to the bare eye. In particular, such an element corresponds to a victim or a group of victims engulfed (i.e. buried) under the snow following an avalanche flow, to a victim or a group of victims of a sinking, to an individual within a crowd, to aircraft debris following a crash and which are scattered in a hard-to-reach zone, improvised anti-personnel mines, etc.

To locate such engulfed elements, an intervention team is usually mobilized for covering the identified search zone.

In the case of the search for victims of an avalanche e.g., such a team consists of survivors of the flow usually supplemented by organized rescue services arriving at the avalanche scene by helicopter winching, snow scooter when the terrain makes it possible, on skis, on foot, etc., which is a gathering of humans costly in terms of time while a person buried under a meter of snow without air pockets has a maximum of eighteen minutes to survive in such conditions.

Over a search zone, the intervention team, the size of which is on average of one hundred and twenty people, uses, for the search of one or more avalanche victims, an "Avalanche victim detector" (AVD) or ARVA (French abbreviation for avalanche victim search apparatus) when the victim(s) are equipped with same, or further a RECCO® detector when the victims are equipped with the corresponding RECCO® reflectors, or more simply a snow probe and a snow shovel for extracting the victim(s) once the victim(s) is/are detected, all this by covering the search zone corresponding to the avalanche flow on foot, which is also takes time, since the rescuers travelling on foot, are most often hampered by the configuration of the search terrain traveled.

The same applies to the location of the other examples of engulfed elements as mentioned above, generally associated with an effective time for arriving at the search zone and of the location which is longer than the time available as defined by the survival/initiation/dangerousness constraints of the engulfed element and/or as defined by the capabilities of the intervention team.

SUMMARY OF THE INVENTION

The purpose of the invention is to overcome the drawbacks of the prior art by proposing a method for an accelerated and optimized location compared with the current location methods for such engulfed elements while at the same time, increasing the safety of the intervention team.

To this end, the subject matter of the invention is a method of assisting in the location of at least one element engulfed within a predetermined search zone, the method being implemented by a location assistance system comprising at least a plurality of patrollers, at least one first patroller corresponding to a drone, the method comprising at least the following steps:
- arriving at the predetermined search zone by at least said drone,
- determining the topography of the predetermined search zone, by at least said drone,
- dividing—by at least said drone—the predetermined search zone into search sub-zones according to the topography and search capabilities of each patroller of the location assistance system, and assigning each search sub-zone to at least one patroller of the location assistance system,
- searching for said at least one element engulfed through every search sub-zone, by the at least one patroller assigned to said sub-zone,
- periodic inter-patroller communication at least until said at least one engulfed element is located.

Thus, by using the location assistance method according to the present invention, a suitable search strategy is systematically and rapidly obtained for the search zone to be processed, corresponding to the geographical location where the searched element is assumed to be engulfed.

Indeed, the implementation by a drone (i.e. without human intervention) of an arrival at the search zone, the determination of the topography thereof and the organization of the search by dividing the search zone into sub-zones and assigning the sub-zones, saves valuable time while preserving the safety of human rescuers.

The method according to the present invention is then particularly advantageous for speeding up the identification of the engulfed element sought, such as a victim buried under snow, the steps performed by the drone(s) which arrived at the search zone being performed beforehand or at least parallel to the human arrival alone, so that once the human patrollers are on site, the search is already organized and completely suited to the search environment, the route of each patroller, either human or drone, being planned and optimized.

Moreover, the method according to the present invention is advantageously based on inter-patroller collaboration (i.e. cooperation) by periodic communication in order e.g. to accelerate the triangulation for reporting an engulfed element corresponding e.g. to an avalanche victim.

According to other advantageous aspects of the invention, the method for assisting in the location of at least one engulfed element within a predetermined search zone comprises one or a plurality of the following features, taken individually or according to all technically possible combinations:

the drone implementing the determination of the topography is a drone which is at least temporarily dedicated to the coordination of the search, and corresponds to a predetermined drone of said plurality of patrollers, to the drone having the best data transmission topology towards each of the other patrollers, or to the first drone to arrive at said predetermined search zone;

the drone which is at least temporarily dedicated to the coordination of the search, is configured to share the processing of determination of the topography with other drones of the plurality of patrollers, having also arrived at the predetermined search zone and carrying at least one lidar;

the drone at least temporarily dedicated to the coordination of the search, determines, from the topography, regions of the predetermined search zone having a radio coverage below a predetermined threshold, and according to said regions, determines the location of relay patroller(s) of said plurality of patrollers, a relay patroller participating in maximizing the radio coverage of the entire predetermined search zone;

each search sub-zone is associated with a route plan across said sub-zone, every route plan being based on the calculation of a shortest path for covering the associated sub-zone depending upon at least one element belonging to the group comprising at least:
the capabilities of the patroller to which said sub-zone is assigned,
the type of detector carried by said patroller,
the topology of the terrain,
the current aerology;

the plurality of patrollers further comprises at least one second patroller corresponding to an operator carrying electronic equipment, the electronic equipment comprising at least one display and manual entry module and being configured to communicate with every patroller of said plurality of patrollers and to detect said at least one engulfed element, and wherein the calculation, associated with the division into sub-zones and the assignment thereof, is configured to be distributed by the drone at least temporarily dedicated to the coordination of search, between a set of drones belonging to the plurality of patrollers and said at least one electronic equipment;

a predetermined probability of successful location of said at least one engulfed element is associated with every sub-zone according to the nature of the engulfed element and/or the topology of the environment of the predetermined search zone suitable for covering said engulfed element, the search being prioritized in the sub-zone(s) associated with the highest probability;

the assignment of search sub-zone(s) is configured to be reconfigured in real time according to a current status of every patroller of said plurality.

The invention further relates to a system for assisting in the location of at least one element engulfed within a predetermined search zone, the system comprising at least a plurality of patrollers, at least a first patroller corresponding to a drone configured for:

arriving at the predetermined search zone,
determining the topography of the predetermined search zone,
dividing the predetermined search zone into search sub-zones depending upon the topography and upon the search capabilities of every patroller of the location assistance system, and assigning every search sub-zone to at least one patroller of the location assistance system,
every patroller of the location assistance system being configured to:
search for the at least one engulfed element across every search sub-zone assigned to the patroller,
communicating periodically with the plurality of patrollers at least until the at least one engulfed element is located.

The further subject matter of the invention is a set of electronic equipment for assisting in the location of at least one element engulfed within a predetermined search zone, said equipment being suitable for being carried by at least one patroller of the plurality of patrollers of the aforementioned location assistance system, the electronic equipment comprising at least:
a communication module configured for communicating periodically with the plurality of patrollers,
a search module configured for detecting said at least one engulfed element
a display and manual entry module configured for displaying at least the current search status and/or the search route assigned to the patroller and for entering at least one request and/or status of said patroller.

BRIEF DESCRIPTION OF THE DRAWINGS

Such features and advantages of the invention will become clearer upon reading the following description, given only as a non-limiting example, and made with reference to the enclosed drawings, wherein.

DESCRIPTION OF THE PREFERRED EMBODIMENTS

Figure 1:
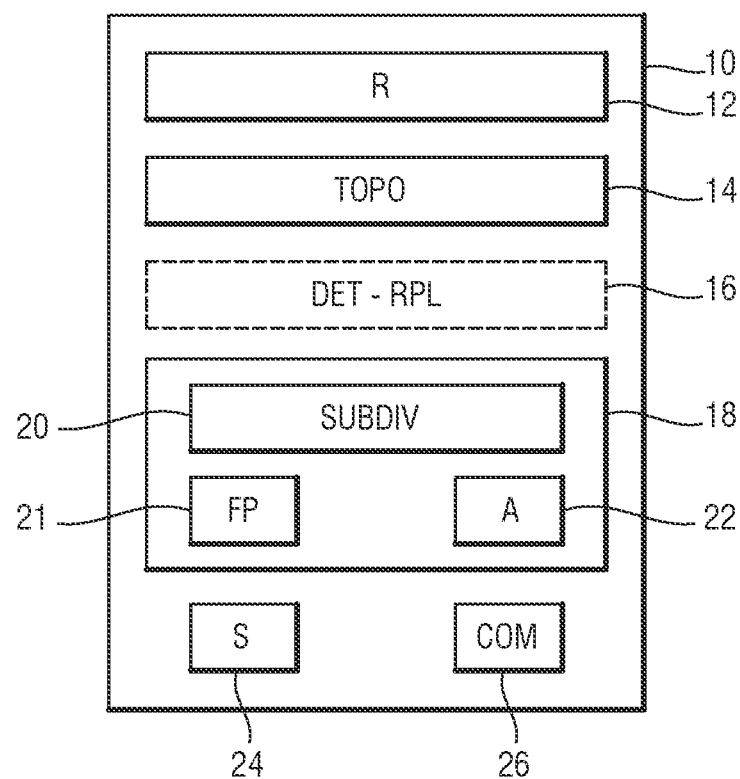
FIG. 1 is an flow chart of a method for assisting in the location of at least one engulfed element, according to the invention.

FIG. 1 shows an example of a flow chart of the method 10 for assisting in the location of at least one engulfed element according to the present invention. Such a method 10 is implemented by a location assistance system, an example of which is illustrated later with reference to the following FIGS. 2 to 9, the system comprising at least a plurality of patrollers, at least a first patroller corresponding to a drone.

Thereafter, "drone" will refer to a vehicle without a pilot aboard ("Unmanned Vehicle"), and depending on the search zone and on the type of engulfed element, such a drone is a vehicle moving through space, in the air, on land, on water or further underwater.

To search for an engulfed element corresponding to an aeronautical black box immersed in a maritime zone following an aircraft crash e.g., an underwater drone or UUV ("Unmanned Underwater Vehicle") without a "human" pilot aboard is suitable for being used according to the present invention and can correspond to a first type of underwater drone, called a ROV (Remotely Operated Underwater Vehicle), which is remotely piloted, e.g. by a control station via a cable called a leash or to a second type of underwater drone called an AUV (Autonomous Underwater Vehicle), configured to operate autonomously (i.e. without human remote control) by alone determining the set of motions to be carried out.

As an alternative, a drone corresponding to an autonomous motorized flying device (i.e. an aircraft), e.g. configured to use obstacle avoidance without human intervention aboard, also called a UAV (Unmanned Aerial Vehicles) drone is used for searching for a engulfed element, such as a victim or a group of victims buried under the snow following an avalanche flow, a victim or a group of victim of a sinking, an individual, especially a dangerous individual, within a crowd, improvised anti-personnel mines, etc.

To do this, such drones are in particular equipped with (i.e. carry) a sensor or a detector suitable for the type of engulfed element sought. Such a sensor corresponds e.g. to: one or a set of shape-recognition cameras for identifying a wanted individual within a crowd or further aircraft debris in hard-to-reach zones, and/or a lidar for searching for improvised anti-personnel mines by detecting singular zones of terrain, etc.

According to a first step 12, the location assistance method 10 comprises the arrival R of at least said drone at the predetermined search zone. In other words, according to the first step 12, the drone(s) arrive autonomously on the intervention sector corresponding to the mission thereof.

According to a second step 14, when said at least one drone is in the predetermined search zone, said at least one drone then implements the determination of the topography TOPO of the predetermined search zone, in particular by means of a topography apparatus same is carrying, such a topography apparatus being used for obtaining a three-dimensional 3D representation of the search zone.

According to a particular aspect, the drone implementing the determination of the topography is a drone at least temporarily dedicated to the coordination of the search and corresponds to a predetermined drone of said plurality of patrollers, to a drone arbitrarily selected from the plurality of patrollers, to the drone presenting the best data transmission topology toward each of the other patrollers, or to the first drone to arrive at said predetermined search zone.

Such a coordination drone has at least temporarily a coordination token representative of the coordination role thereof within the location assistance system, namely to define the missions of every patroller.

In particular, the drone at least temporarily dedicated to the coordination of the search, is suitable for sharing the processing of the determination of the topography with other drones of the plurality of patrollers, having also arrived at the predetermined search zone and carrying at least one lidar (light detection and ranging), a remote measurement technique based on the analysis of the properties of a beam of light returned to the emitter thereof. In other words, the search coordination drone distributes zones, the topography of which is to be determined depending upon the number of drone(s) equipped e.g. with a lidar. The geographical coordinates of such zones are sent to each drone equipped with a lidar.

According to an optional step 16, shown in dotted lines, said at least one drone determines, from the topography, regions of the predetermined search zone having a radio coverage below a predetermined threshold, and according to said regions, determines the location of relay patroller(s) (DET-RPL) of said plurality of patrollers, a relay patroller participating in maximizing the radio coverage of the entire predetermined search zone.

In other words, according to the optional step 16, the search coordination drone synthesizes the topography of the terrain and establishes the zones which are not covered in terms of communication network, by considering a plurality of drones located at the same altitude, and then calculates a plurality of relay points. Such relay points allow drones to modify the altitude thereof by rising e.g. so as to provide a maximum coverage of the search zone. According to a subsequent step 18, said at least one drone divides 20 (SUBDIV), of the predetermined search zone into search sub-zones depending upon the topography and the search capabilities of every patroller of the location assistance system, and an assignment A 22 of every search sub-zone to at least one patroller of the location assistance system. In other words, a search sub-zone according to the present invention is a subset (a sub-division) of the search zone which results from an optimized division thereof.

In particular, depending on the aforementioned optional relay points, on the number of search drones and on the search zone to be covered, the coordination drone calculates the different search sub-zones e.g. using a shortest path algorithm as detailed thereafter, and sends to every patroller the assigned sub-zones, the topography and the relay points, then becomes a search drone if the equipment thereof make it possible.

According to an optional aspect, the step 18 further comprises the association 21 of a predetermined probability FP for a successful location of said at least one engulfed element to each sub-zone, depending upon the nature of the engulfed element and/or upon the topology of the environment of the predetermined search zone suitable for covering said engulfed element, the search being prioritized in the sub-zone(s) associated with the highest probability.

Then, according to a step 24, the search S of said at least one element engulfed in every search sub-zone is carried out by the at least one patroller assigned to said sub-zone.

In parallel with all of the steps described above, according to a step 26, a periodic inter-patroller communication COM is implemented at least until said at least one engulfed element is located. In particular, for the location assistance system according to the invention to be as adaptable as possible and the most optimized, every patroller, in particular every patroller drone, receives the same information in real time, which in particular allows a drone to perform one or a plurality of distinct roles at different times of the mission and depending on the circumstances.

Subsequently, for the sake of conciseness, every step of the method 10 according to the present invention is described in greater detail in relation to FIGS. 2 to 9, for an application to a search for avalanche victim(s), such an application remaining transposable to the other examples of engulfed elements as described above.

For such an application for a search for an avalanche victim, flying drones (i.e. aircraft) are preferentially used for carrying a search mission for victims buried under a snow avalanche, and carry an ARVA/DVA and/or a RECCO® detector for detecting the corresponding signal emitted by a victim carrying such an ARVA/DVA or RECCO® reflectors.

In particular, a DVA or ARVA avalanche victim detector is a transceiver to be worn under clothing which allows, in the emission position, to be found under a flow, and in the reception position, to find a victim. Whether analogue or digital, all ARVAs/DVAs have a transmission frequency of 457 kHz.

Unlike an ARVA/DVAs, RECCO® is a passive system. The skier wears small reflector plates wherein a copper antenna and a diode are integrated. No battery is needed. To find the small plates, and therefore the victim, the emergency services use the RECCO® detector emitting at a frequency that the reflector will send back doubled. For reasons of detection efficiency, it is recommended to wear a reflector (i.e. reflector plate) on each side of the body. For this reason, it is generally recommended to wear a small plate on each ski boot.

According to such particular example of application of a search for avalanche victim(s), the plurality of patrollers of the positioning assistance system according to the invention comprises, even preferentially, a fleet of flying drones (i.e. aircraft) and a second type of ground patroller(s) corresponding to a human rescuer (i.e. human operator) and/or to a ground robot participating in the search, the rescuer and/or the robot carrying a new electronic equipment E called hereafter e.g. AVDALD (Avalanche Victim Detector Aircraft Link Device). According to the present invention, such an electronic equipment comprises at least one human-machine interface and is configured to communicate, via a transceiver, with every patroller of said plurality of patrollers and to detect said at least one engulfed element, herein corresponding to an avalanche victim, via a DVA and/or a RECCO® detector.

Advantageously, the electronic equipment E also called AVDALD is suitable for being transported by air to the search zone 28 (i.e. emergency zone) by one or a plurality of drones of the location assistance system.

For such application of a search for an avalanche victim, prior to the step 12 of arrival R at the predetermined search zone of at least one flying drone, the flying drone(s) and AVDALD electronic equipment have the parameters thereof set on the ground or in flight with in particular: the geographical position of the search zone, the total number of patrollers participating in the search, such number including the number of flying drones and the number of ground rescue personnel, said number being updated throughout the mission, the role of the patroller, whether it is a flying drone or ground rescue (either a human or ground robot) carrying AVDALD equipment, namely e.g. the role of coordinating search.

According to the periodic inter-patroller communication COM step 26 implemented at least until said at least one engulfed element—herein corresponding to one to several avalanche victims—is located, the patroller or patrollers, whether a drone or a carrier of an AVDALD equipment, know in real time, the position thereof, the autonomy thereof, the status thereof and the status of the on-board equipment thereof, the topography of the terrain, the status and position of other drones (i.e. aircraft), the flight plan thereof.

Figure 2:
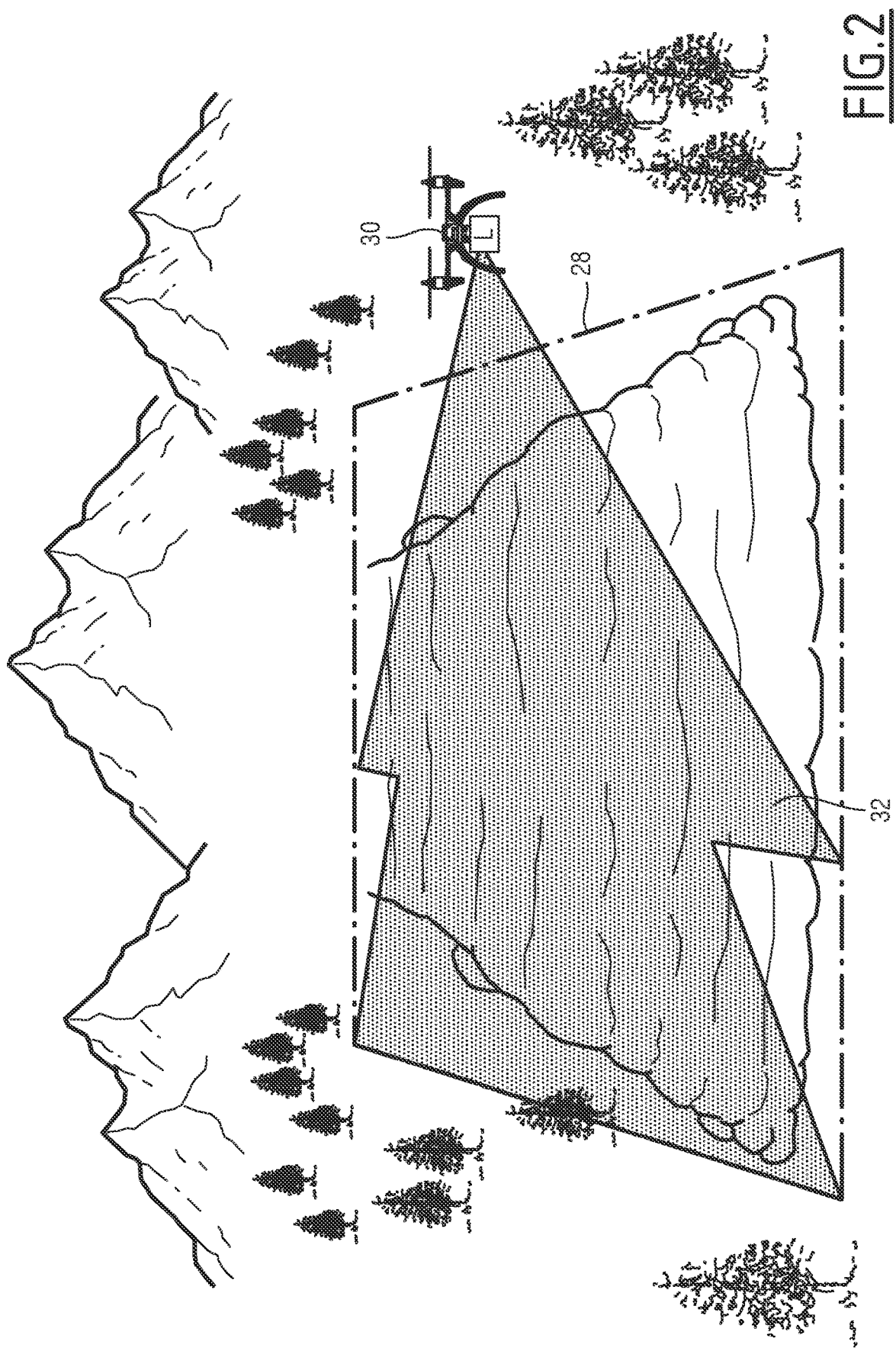
FIGS. 2 and 3 illustrate two steps of the method according to FIG. 1, as applied to a search of an avalanche victim.

FIG. 2 illustrates the second step 14 of determining the topography TOPO of the predetermined search zone 28 corresponding herein to a mountain zone where an avalanche flow occurred and buried potential victims.

The flying drone 30 shown in FIG. 2 is at least temporarily dedicated to the coordination of the search and corresponds to a predetermined drone of said plurality of patrollers, or is the first drone to arrive at said predetermined search zone 28.

According to a particular aspect, the coordination drone 30 quantifies the size of the search drone patrol by analyzing the equipment present in full autonomy, i.e. without a prior parameterization of the number of patrollers being carried out before the take-off thereof.

The topograph(y)(ies) (i.e. the three-dimensional mapping) of the search zone 28 for the victims is (are) carried out during the step 14 by means of a survey 32, all this before the launching the step 24 of searching S for victims. Advantageously, such a step is implemented by the coordination drone 30 equipped with a lidar L used for specifically establishing the topography of the avalanche flow zone 28, the topography of the zone 28 having changed due to the avalanche and not being known in fact beforehand.

According to the step 26 of periodic inter-patroller communication COM, such a topography is sent to all search drones and to the AVDALD forming the plurality of patrollers mobilized for the search.

Figure 3:
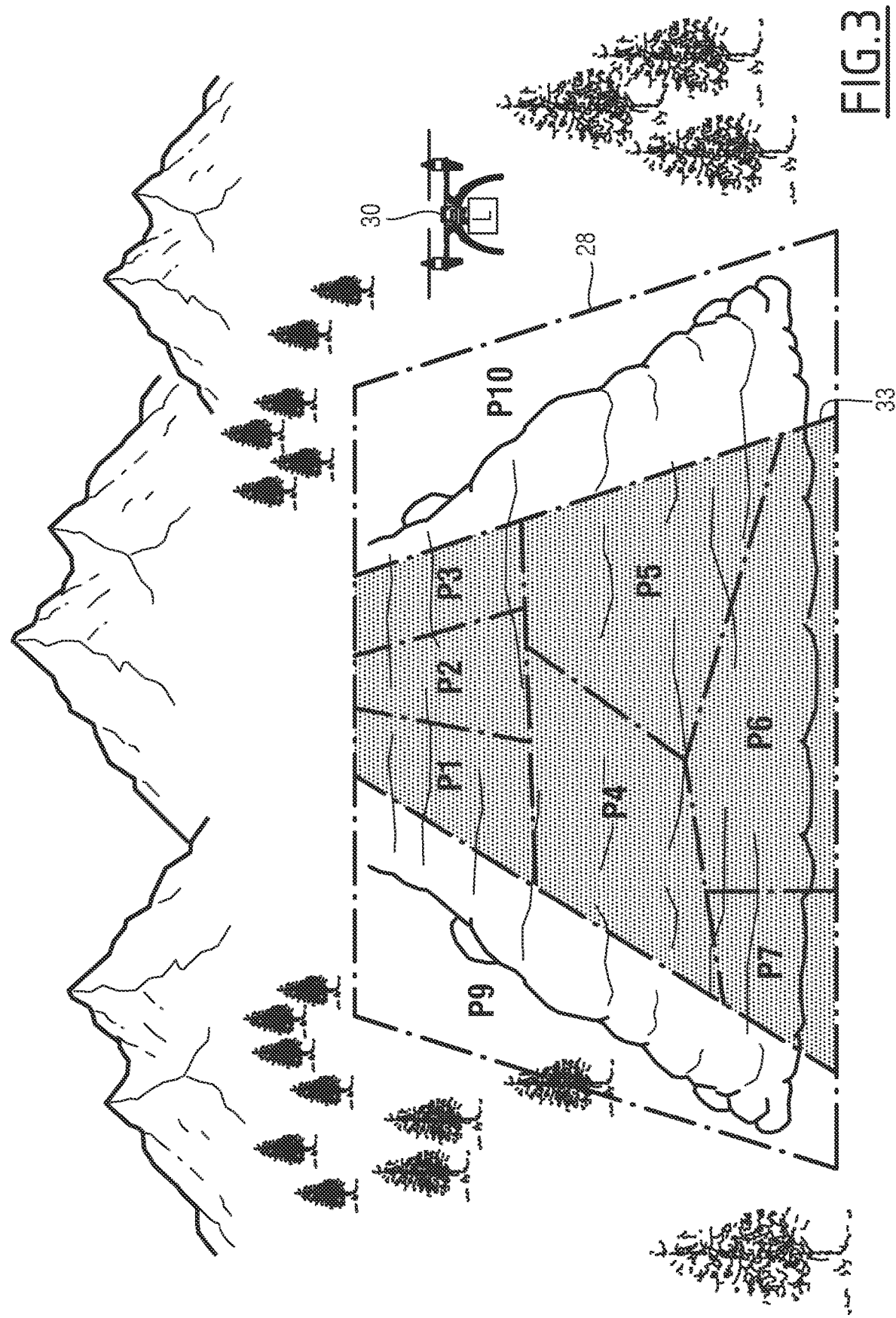
Figure 4:
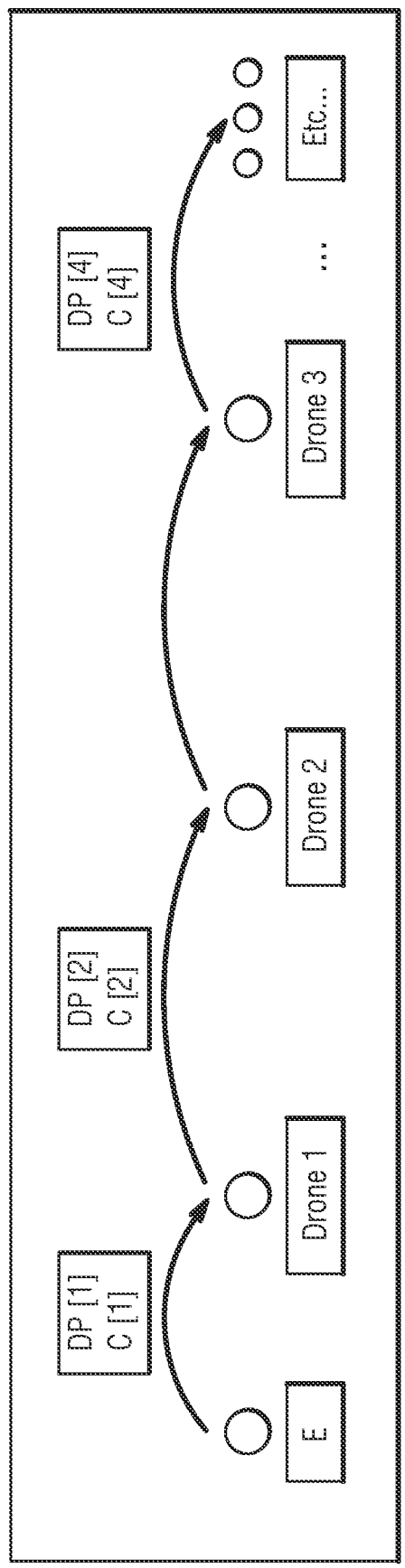
FIG. 4 is also associated with an application of a search for an avalanche victim and illustrates an example of a calculation of the coverage of the predetermined search zone.
Figure 5:
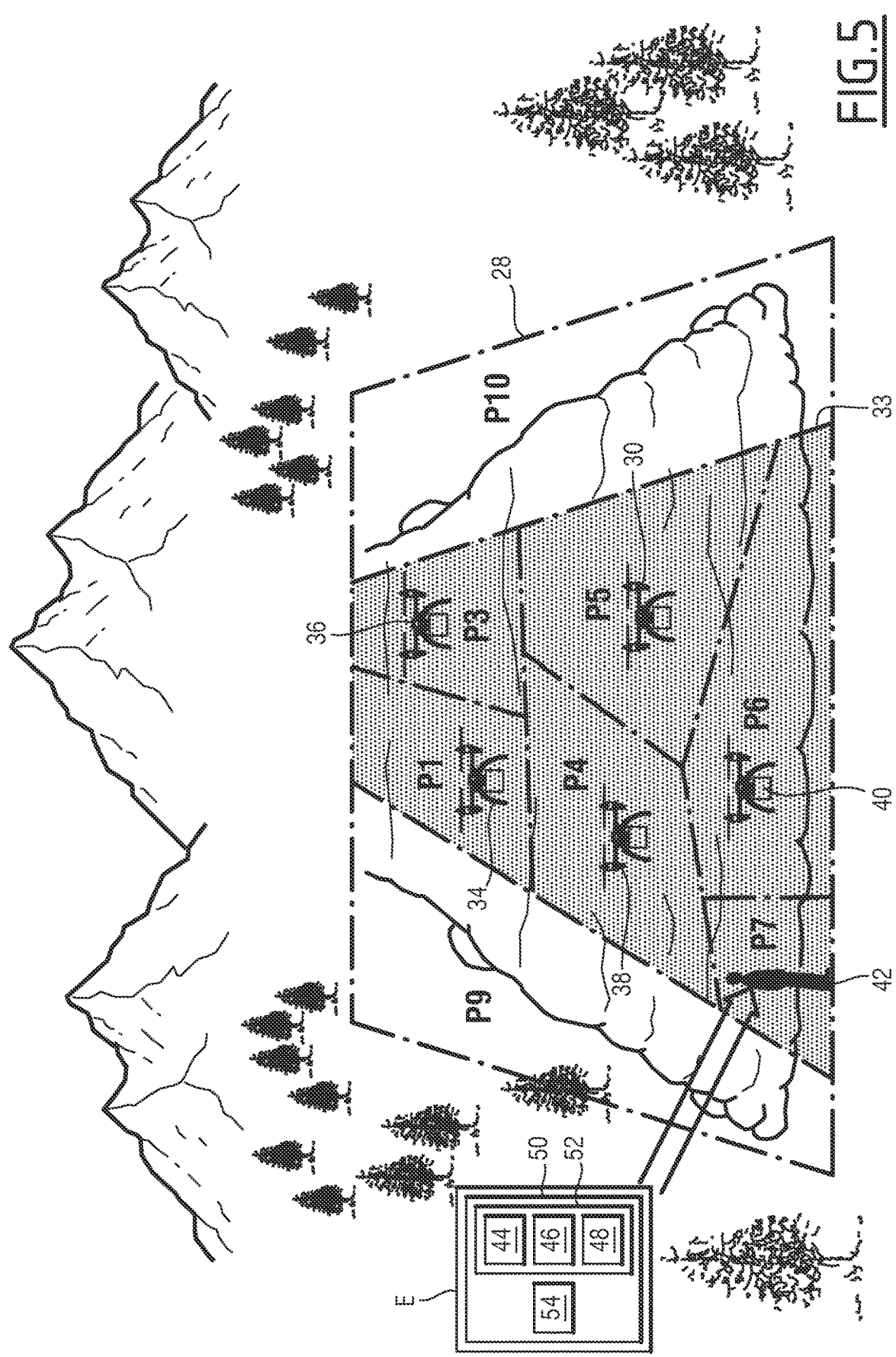
FIGS. 5 and 6 illustrate two steps of the method according to FIG. 1 applied to the search of an avalanche victim.

FIGS. 3, 4 and 5 illustrate various aspects of the step 18 implemented by the coordination drone 30 comprising a division 20 (illustrated by FIG. 3) of the predetermined search zone 28 into search sub-zones P1, P2, P3, P4, P5, P6, P7, P9 and P10 depending on the topography and on the search capabilities of every patroller of the location assistance system, and an assignment 22 (shown in FIG. 5) of every search sub-zone to at least one patroller of the location assistance system.

More precisely, the division 20 illustrated by FIG. 3 is performed by taking into account, the total number of patrollers participating in the search, such number comprising the number of flying drones and the number of ground rescuers (human rescuer and/or ground robot) and also depending on the predetermined search zone 28, the topography thereof and advantageously the current aerology (i.e. at a current time).

According to a particular aspect, each search sub-zone is associated with a route plan across said sub-zone, every route plan being based on the calculation of a shortest path for covering the associated sub-zone depending on at least one element belonging to the group comprising at least the capabilities of the patroller to which said sub-zone is assigned, the type of detector carried by said patroller, the topology of the terrain, the current aerology.

When the plurality of patrollers comprise e.g. only flying drones, the predetermined search zone 28 is divided by the coordination drone 30 into N sub-zones with N being an integer, N depending on the number of flying search drones. The predetermined search zone 28 is delimited by the coordination drone 30, and each affected sub-zone is sent to the different search drones in the form of a route plan of the sub-zone corresponding to a flight plan. In other words, each sub-zone obtained is associated with a flight plan. Such flight plan is optimized by a shortest path algorithm according to the capabilities of every flying drone (i.e. aircraft), the sensor thereof, the topology of the terrain and, advantageously, the aerology. The flight plan takes into account the topology so that every flying drone is always visible from at least one other flying drone so as to send the data thereof.

According to another example, when the plurality of patrollers comprises both ground rescuers (human rescuer and/or ground robot) and flying drones, taking into account the topography (i.e. three-dimensional mapping) carried out, the search zone is divided into sub-zones by taking into account the skills of the rescuer(s). In other words, a sub-zone reserved for the search of victims by a human rescuer(s) on the ground is delimited depending on the physical skills of the rescuer(s) and on the terrain to be covered. Smaller and more easily accessible sub-zones e.g. are assigned to human rescuers, harder to access and larger zones are assigned to flying drones.

Optionally, the step 18 further comprises the association 21 of a predetermined probability FP for a successful location of avalanche victim(s) at each sub-zone depending on the avalanche topology deduced from the topography determined beforehand, the search being prioritized in the sub-zone(s) associated with the highest probability. In other words, the division 20 into sub-zones and the assigning thereof are optimized according to the probabilities of finding victims according to the typology of the avalanche flow, such probabilities being predetermined e.g. from a statistical processing of a database collecting the different rescue interventions for past avalanche victim(s). As illustrated by FIG. 3, the search is e.g. prioritized on the high probability sub-zones P1 to P7 which form the set 33 and then on the low probability sub-zones P9 and P10.

FIG. 4 illustrates an example of calculation of the coverage of the predetermined search zone needed for determining each route plan based on the calculation of the shortest path for covering the associated sub-zone, such a calculation being used for a route optimization which reduces both the travel time and the number of detection passes over the same sub-zone.

More precisely, the purpose of such calculation is to provide every patroller with the sub-zone to be covered and the associated route plan along with the role assigned to the patroller within the patrol unit, all this in a changing context so that such a calculation can to be repeated in real time for every reconfiguration linked to one or more changes of contexts corresponding in particular to an addition or loss of patroller(s), a change in the terrain related to a new flow or a weather phenomenon, a change in the search conditions such as the passage from daytime to nighttime requiring adding more patroller equipment by means of an infrared and/or thermal camera, e.g., etc.

The inputs of such a calculation correspond to the number of patrollers configured to actively detect a signal representative of an avalanche victim, and, for each patroller, to the autonomy thereof in terms of electronic search equipment, the performance thereof such as the speed of movement thereof, the capacity thereof to rise in altitude, the types and performance of the electronic equipment such as the type and performance of the detectors/sensors, meteorological and aerological data including in particular the wind speed and direction, the surface area to be covered including the surface area due to the terrain, etc.

According to such calculation, as illustrated by FIG. 4, a calculation of the theoretical search coverage available is implemented by a step-by-step concatenation of the capacity of the traveled distance DP and the coverage C which can be achieved by each patroller (i.e. the size of the surface area "probed" by the DVA or RECCO® detector carried by the patroller in question), all this according to a particular advantageous aspect, by implementing a meshed communication network (i.e. comprising several point-to-point links, a patroller being configured to have one to M point-to-point connections toward a plurality of other patrollers with M being an integer greater than 1) in order to improve inter-patroller transmission speed rather than a chained communication network (i.e. with a ring topology).

As illustrated by the example shown in FIG. 4, such a concatenation begins with a ground patroller equipped with an electronic equipment E called AVDALD for the application of a search for an avalanche victim, associated with a capacity of traveled distance DP[1] and an achievable coverage C[1], continues with a drone patroller 1 associated with a capacity of traveled distance DP[2] and an achievable coverage C[2], followed by a drone patroller 2 associated with a capacity of traveled distance DP[3] and an achievable coverage C[3], followed by a drone patroller 3 associated with a capacity of traveled distance DP[4] and an achievable coverage C[4], etc. until all patrollers are taken into account so as to obtain the total achievable coverage and the total route capacity which can be provided by the plurality of patrollers.

Then, according to such calculation, the total achievable coverage and the total travel capacity are automatically projected, by the coordinating patroller 30, onto the three-dimensional model of the terrain of the predetermined search zone 28 obtained from the topography determined beforehand, so that the ground patrollers equipped with AVDALDs are placed on low-slope sub-zones and not far from the current position thereof.

The flight plans of flying drone patrollers are obtained and adjusted so as to keep a margin of autonomy and/or to avoid elements of terrain such as rock peaks, etc. or further the crossing of such type of terrain element for the sake of energy and time saving, and also depending on the constraints of the search patterns and the ranges determined by the DVA/RECCO® detectors used, of which the number of antennas and performance vary from one type of detector to another, such as continuous path patterns in square waves or along parallel lines.

Optionally and advantageously, the relay point drones are then also taken into account in such calculation and make it possible to cover the zones of radio shadowing, the patrollers having to communicate 24 cyclically throughout the search 26. The role of relay point is assigned according to the current position of the drone assigned to such role with respect to the current position of the other patrollers.

According to a first option of assignment and of determination of the flight plan, depending on the autonomy thereof, a relay point drone rises to a first predetermined altitude above the terrain so as to check the radio coverage by simulating the flight/route plan of every patroller, and eliminates relay drones which generate radio coverage redundancy while adjusting to a minimum, the altitude of the other drones assigned as relays so that same can continue to detect a signal representative of the presence of a victim.

If such first solution does not cover the entire communication zone associated with the search zone, according to a second option, all the patrollers then take the role of relay point, simultaneously rise to the first predetermined altitude and simulate the flight plan thereof by eliminating relay drones which generate coverage redundancies.

If neither of the two options works, only one flying drone takes the role of a relay point and rises to a second predetermined altitude greater than the first predetermined altitude, the second predetermined altitude no longer allowing same to participate in the detection of a signal representative of the presence of a victim, which implies repeating the calculation from the beginning taking into account the decrease in the number of drones participating in the search, until the route/flight plans of every patroller are obtained, providing continuous radio coverage throughout the search. In particular, such route/flight plans of every patroller are further configured for preventing any interference of communication between patrollers and also on the signal coming from a DVA equipment of a potential avalanche victim.

Advantageously, as illustrated by FIG. 5, the delimitation of the sub-zones assigned to ground rescuers is sent by the coordination drone 30 to the electronic equipment E (i.e. electronic terminal) AVDALD which equip the same ground rescuers. The electronic equipment E can be specifically used, according to the invention, for communicating with all the search drones mobilized on the predetermined search zone 28.

More precisely, according to the example shown in FIG. 5, the coordination drone 30 is assigned to the sub-zone P5, the sub-zone P1 is assigned by the coordination drone 30 to the flying drone 34, the sub-zone P3 to the drone 36, the sub-zone P4 to the drone 38, the sub-zone P56 to the drone 40, and sub-zone P7 to the ground rescuer 42 via the electronic equipment E. The sub-zone P9 and P10 are not processed at first given the number of patrollers and the low associated probability thereof.

As an option, every search drone 34, 36, 38, 40 or electronic search equipment E is assigned 22 to a priority search sub-zone and one or a plurality of secondary sub-zone(s) and the associated flight plan assigned thereof by the coordination drone 30 which calculates the segmentation of the mission zone 28. The drone 34 e.g. has to travel first to the sub-zone P1, and then, once the route over P1 has ended, the sub-zone P9 associated with a lower probability of the presence of a victim than the probability associated with P1. All sub-zones and flight plans are known to all drones and electronic equipment E of a ground rescue patroller.

Moreover, the location of the relay point, which is optionally determined as mentioned above, is also indicated during the assignment step 22 by assigning the role of relay point to some of the patroller drones, so that instead of participating in a search, such drones are dedicated to relaying the information received from neighboring drones of the relay point location thereof. Such an assignment 22 of the role of relay point can be reconfigured in particular depending on possible no-show of patrollers during the search.

The ground rescuer 42 receives the delimitation of the sub-zone P7 thereof sent by a transceiver (not shown), from the coordination drone 30 via a communication module 44 connected to a transmission-reception antenna (not shown) of the electronic equipment E, called AVDALD. The electronic equipment E called AVDALD further comprises a search module 46 and a display and manual entry module 48 for the ground rescuer 42, such a module 48 comprising a human-machine interface.

More precisely, the communication module 44 of the electronic equipment E is configured for sending and receiving the data exchanged with the drones, 30, 34, 36, 38, 40 and, where applicable (not shown), the data exchanged with other electronic equipment E carried by other patrollers (i.e. rescuer) on the ground. Such data exchanged cover the current position of every patroller, the current search status of every patroller, such a status corresponding e.g. to: "absence of victim", "victim search in progress", "victims found", "assisting the search of another patroller", further cover the state of the equipment of every patroller such as the autonomy thereof, the failure of a sensor, a flight plan, or further the topography (three-dimensional mapping of the search zone 28).

The search module 46 comprises a detector suitable for the type of engulfed element, namely herein an avalanche victim search apparatus DVA and/or a RECCO® detector and is configured for processing the spectral values or the direction of the victim and the intensity of the signal from the tracking device DVA of the victim.

In particular, the display and manual entry module 48 is configured for displaying information data from the ground rescuer patroller 42 and to enable same to enter the operator commands. It is thus possible e.g. for the ground rescuer patroller 42 to view the status of the current search, in other words, the progress thereof along with a return on the location of the victims found and/or a monitoring of the routes and flight plans of every patrollers and of the operational status thereof.

In other words, such electronic equipment E can be used for a collaborative search between patrollers by displaying the route to be taken, by sending a request command for search assistance, by marking the location of a localized victim.

In the example shown in FIG. 5, the electronic equipment E comprises an information processing unit 50, formed e.g. by a memory 52 associated with a processor 54 such as a CPU (Central Processing Unit).

In the example shown in FIG. 5, the communication module 44, the search module 46 and the display and manual entry module 48 [are] each produced in the form of software which can be executed by the processor 54.

The memory 52 of the information processing unit 50 is then configured to store a first communication software, a second search software, a third display and manual entry software.

The processor 54 is then configured to execute the aforementioned software.

In a variant (not shown), the communication module 44, the search module 46, and the display and manual entry module 48 are each produced in the form of a programmable logic component, such as an FPGA (Field Programmable Gate Array), or further in the form of a dedicated integrated circuit, such as an ASIC (Application Specific Integrated Circuit).

When at least a part of the electronic equipment E is produced in the form of one or a plurality of software programs, i.e. in the form of a computer program, same is further configured to be recorded on a computer-readable medium (not shown). The computer-readable medium is e.g. a medium configured to store the electronic instructions and to be coupled to a bus of a computer system. As an example, the readable medium is an optical disk, a magneto disk, a ROM memory, a RAM memory, any type of non-volatile memory (e.g. EPROM, EEPROM, FLASH, NVRAM), a magnetic card or an optical card. A computer program containing software instructions is then stored on the readable medium.

According to an optional aspect (not shown), an inter-module interface is implemented within the processing unit 50, in particular when the different modules 44, 46 and 48 are provided by separate suppliers and/or not compatible in pairs. In other words, such an inter-module interface makes it possible to assemble different modules of different makes or types, as well as the inter-module interactions by providing interoperability between the different modules according to a compatible and common dialog.

The processor 54 of the processing unit 50 is configured to synthesize the data supplied by the different modules 44, 46 and 48 which form the electronic equipment E, in particular the detection information obtained via a detector DVA or RECCO® (not shown) of the search module 46. Thus, the processor 54 is configured to set the parameters of every module and every module element via the entered operator commands, via the display and manual entry module 48, and to return by display, the synthesis of the detection information obtained via a DVA or RECCO® detector, to process every request entered by a rescuer patroller 42, to further return a synthetic view of the status of the search according to the information received via the communication module 44, as well as the different menus allowing the rescuer patroller 42 to select the type of representation to be returned or the choices of representations available, allowing a rescuer patroller 42 to modify the flight plan(s) of a drone by in turn becoming a coordinator, the route plan(s) of new rescuer patrollers arriving at the predetermined zone 28 or of the ground patrollers present from the beginning of the search depending on the progress of the search, the victim marking, etc.

When the rescuer patroller 42 becomes a coordinator, the processor 54 of the equipment E is also configured to calculate/modify the own route plan thereof and/or the flight and route plans of the other patrollers and to send same to the patrollers affected by such a modification.

In addition, the processor 54 of the equipment E is configured to communicate, via the communication module 44, with all the other participants in the search and to receive, via this same communication module 44, the topography determined beforehand by the coordination drone 30.

It should be noted that every patroller drone further comprises at least one communication module and one search module, even a topography apparatus for obtaining a three-dimensional 3D representation of the search zone, in particular for the coordination drone 30 acting as a first coordinator on the predetermined search zone 28, as well as a processing unit comprising a memory and a processor.

Advantageously, the determination of the topography, like the calculation, associated with the division into sub-zones and the assigning thereof, is configured to be distributed (i.e. shared, allotted), by the drone 30 which is dedicated, at least temporarily, to the coordination of the search, between all or a portion of the set of drones 34, 36, 38, 40 belonging to the plurality of patrollers and said at least one electronic equipment item E AVDALD carried by the patroller 42, which reduces the electricity consumption associated with such a determination and thus better manages the autonomy and the time capacity of simultaneous intervention of the different patrollers.

Once the steps 12, 14, optionally 16 and 18 have been carried out, the search step 24 S as such is launched on the intervention sector 28 with, in parallel, the communication COM step 26 corresponding to the inter-drone transmission 30, 34, 36, 38, 40 and with the patroller 42 equipped with the electronic equipment item E AVDALD.

In particular, according to the step 26, so as not to interfere with the signals sent by the DVAs of the victims, the drones 30, 34, 36, 38, 40 and the electronic equipment E called AVDALD communicate at regular intervals (i.e. cyclically, periodically) in full duplex (i.e. bidirectional and simultaneously between transmitter/receiver) and each correspondingly switch off the transmitter thereof at every end of transmission. In other words, the communication stage 26 is discontinuous and discretized so that the periods of transmission from the DVAs worn by the victims are not interfered with by inter-patroller communications 26, which means inserting the inter-patroller communications 26 into the periods of silence of the transmitters, such as DVAs, worn by the victims.

If allowed by the terrain, the simultaneous transmission from one patroller to every other patroller is direct (i.e. point-to-point) in the direction of all other patroller drones and ground patroller equipped with the electronic equipment E called AVDALD.

If not allowed by the terrain, for the transmission of "relay point drones", the drones transmit and repeat and complete all the data in the direction of the other drones in sight.

In particular, the data sent by each transmitter patroller (i.e. drones and/or ground patrollers via the electronic equipment E AVDALD thereof) relate first of all to the identification of the transmitter patroller and include in particular the patroller identifier thereof, unique within the plurality of patrollers (i.e. patroller unit) the location assistance system mobilized on the predetermined search zone 28, but also the role thereof within the patrol unit, namely: an abandonment role, especially in case of battery level below a predetermined threshold, a search role, optionally a relay point role, a coordination role, a role of assistant to another patroller, such roles being cumulative with the exception of the abandonment role. Every role being e.g. associated with a unique identifier of the associated role and with a binary value indicating whether or not the role is endorsed by the patroller in question.

Moreover, the data transmitted between patrollers (i.e. drones and/or ground patrollers via the electronic equipment E AVDALD thereof) cover the status of the transmitter patroller, namely the battery level thereof which is representative of the autonomy thereof, the battery level at the end of the route of the assigned sub-zone and/or an indicator of what was consumed since the beginning of the route over the sub-zone, the status of the different components of the drone or AVDALD.

In addition to the above, the geographical position of the patroller concerned, the position of the victim(s) when detected, a request for assistance in searching over a sub-zone assigned initially to only one patroller, the request being associated e.g. with three distinct values representative of a call for assistance, of a positive response or a negative response, and the number of patrollers in assistance (i.e. in reinforcement) on the search sub-zone, are transmitted.

Such exchanged data are continuously updated by every patroller so as to be relevant and representative of the real time situation at every cyclic transmission.

According to a particular aspect, transient data are also suitable for being transmitted, independently of the aforementioned transmission cycles, in particular in the event of a modification of the flight plan, at the beginning or during the search and concern e.g. the definition of the coordination patroller (i.e. the allocation of the coordination token).

Indeed, the assignment of the coordination role can be temporary and has to be modified when the coordinator patroller (flying drone or ground patroller) withdraws from the mission thereof or is absent (i.e. silent). The coordinator patroller is then replaced in the coordinating role thereof by the patroller (flying drone or ground patroller) which has, at the current moment, the best data transmission topology in the direction of each of the other patrollers.

Other transient data, transmitted independently of the above-mentioned transmission cycles, relate to the assignment of search sub-zone(s) configured to be reconfigured in real time by the coordinating patroller, depending on a current status of every patroller, in particular when a patroller abandons the search. Such data, updated by the coordinator patroller, comprise the location of the predetermined search zone 28 to be covered, the location of every sub-zone assigned to every patroller and optionally the assignment or the non-assignment of the role of communication relay, and the location and identification of the communication relay point patrollers.

Other transient data, transmitted independently of the aforementioned transmission cycles, relate to the victim search assistance request(s) issued by a patroller or by patrollers who detected one or more victims via a DVA or a RECCO® detector. Such a request comprises e.g. a binary value victim search token, a first binary value being associated with an active help request, a second binary value being associated with an abandonment of such a request, such a search token being configured, on reception, to be positioned by the rescuing patroller so as to be representative of the role as a search aid (i.e. assistant) thereof.

Figure 6:
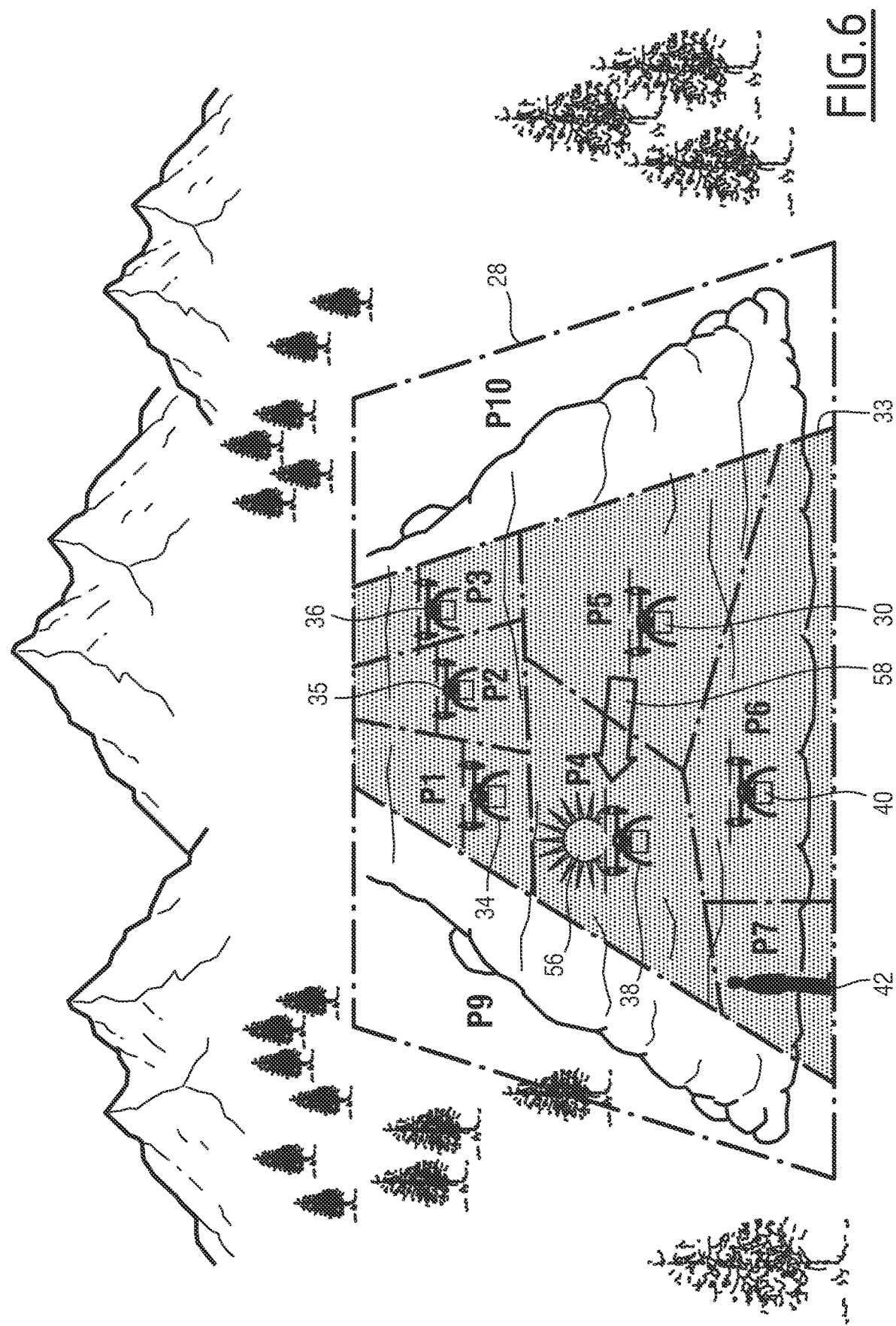

In parallel, during the search step 24 as illustrated by FIG. 6, every patroller 34, 35, 36, 38, 30, 40, 42 travels the search sub-zone P1, P2, P3, P4, P5, P6, P7 thereof, respectively, by following the flight route/plan calculated beforehand and provided by the coordination patroller, namely the drone 30, and cyclically transmits the geographical position thereof to all the other patrollers. In addition, every patroller records in real time, the route followed within a dedicated memory of a flying drone or of the electronic equipment E herein called AVDALD.

During the search step 24, two situations arise for every patroller, namely a search either with or without detection of an actual victim.

Without the detection of an actual victim, the patroller follows the flight route/plan associated with the assigned sub-zone thereof and cyclically communicates the status thereof to the other patrollers. Depending on the data exchanged at each cyclic communication step 26, or depending on the communicated transient data representative of a reconfiguration of the search, a patroller concerned is able to move for searching on a new sub-zone in collaboration with another patroller, or on a larger sub-zone if one of the patrollers were to withdraw, or on a secondary sub-zone if the search on the first sub-zone is completed.

With the detection of an actual victim, as illustrated in FIG. 6, a patroller corresponding herein to a flying drone 38, or further (not shown) to a ground patroller equipped with an electronic equipment E herein called AVDALD, detects a signal 56 coming from the DVA or RECCO equipment of a victim. To be assisted in the search thereof, the flying drone 38 asks the other search patrollers to come and assist in the search thereof. The nearest patrollers which have not detected a victim, or which have not yet assisted a patroller, come to assist the flying drone 38 which has detected the victim. More precisely, the flying drone 38 which spotted the victim, sends to the assisting patrollers, the direction wherein the victim was detected and calculates and sends to the assisting patrollers, the trajectory to follow in order to perform an optimized search. As illustrated by FIG. 6, the flying drone 38 indicates such a trajectory 58 to the assisting drone 30 during a cyclic communication, indicating moreover, the search status thereof with detection and with request for assistance to other patrollers. As assistance is provided, the flying drone 38 cyclically communicates the number of assistances received and the reaching of a predetermined threshold of assistants on the search sub-zone, e.g. two, stops the request for search assistance intended for the remaining patrollers.

Moreover, after detecting the signal 56 coming from the DVA or RECCO equipment of a victim, the flying drone 38, as long as same remains alone on the search sub-zone, then begins to search for the source of the signal by following spiral trajectories in order to detect the local minimum and the maximum reached at the DVA, thus forming a spectral map for finding the source of the emission. Such spiral trajectories are in particular determined by the coordinating patroller 30 informed by the flying drone 38 of such detection of the signal 56 coming from the DVA equipment, or determined by the flying drone 38 as such if same has the capacity and the authorization/instruction given by the coordinating patroller 30. More specifically, such spiral trajectories are determined so that the flying drone 38 does not produce interference on the signal 56 coming from the DVA equipment, nor with another patroller drone nearby.

Figure 7:
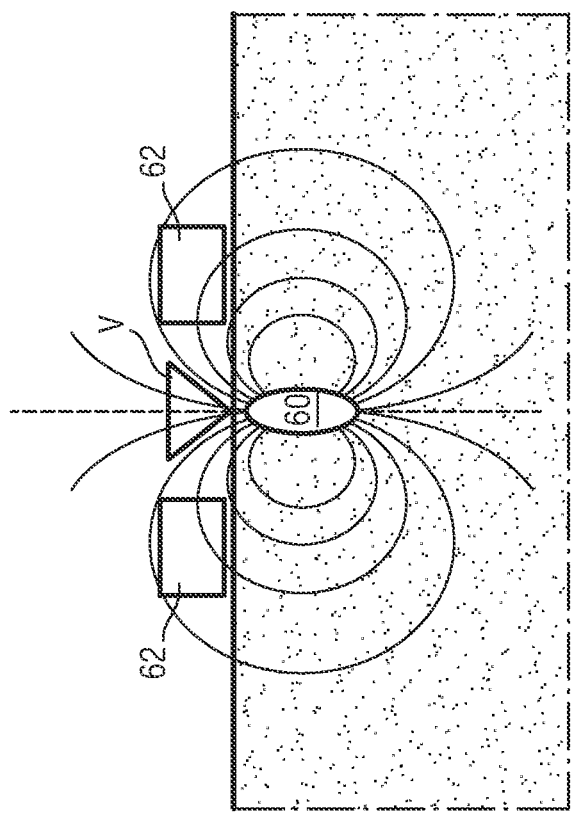
FIG. 7 is also associated with an application of a search for an avalanche victim and illustrates different positions of an avalanche victim detector buried under snow.
Figure 7:
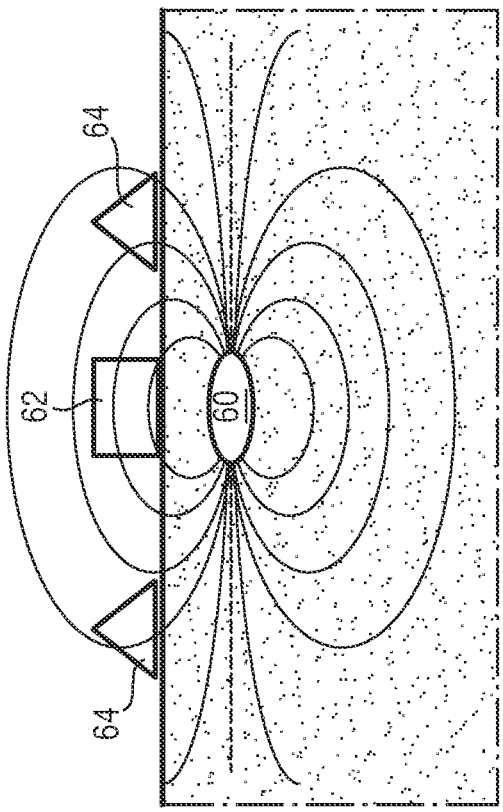
Figure 7:
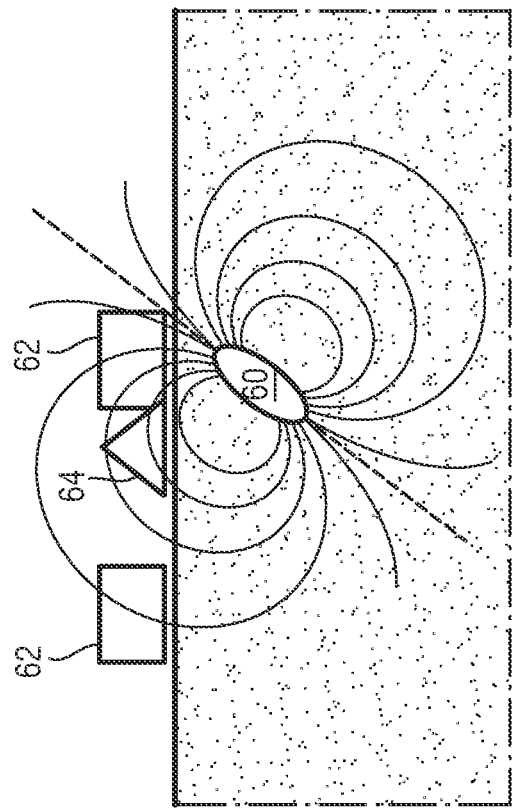

FIG. 7 illustrates three distinct transmission configurations of a DVA 60 worn by a victim buried under the snow, namely horizontally (top left in FIG. 7), vertically (top right in FIG. 7) and at an angle (bottom left in FIG. 7). When the DVA 60 transmits horizontally, a maximum 62 of the DVA signal is located just above the DVA and two local minima 64 are detected symmetrically on both sides. On the other hand, when the DVA 60 transmits vertically, a local minimum V of the signal DVA is located just above the DVA, and two local maxima 62 are detected symmetrically on both sides. When the DVA 60 transmits at an angle, a local minimum 64 is located just above the DVA and two local maximum 62 are detected asymmetrically on both sides. The three configurations are taken into account for adjusting the flight plan of the drone(s) performing the search, such as the drones 38 and 30 shown in FIG. 7.

As soon as the flying drone 38 is assisted by another or a plurality of other patrollers, the flying drone 38 communicates the spectral measurements thereof and the position thereof so that the other patrollers can position in an optimal and complementary way and optimize the search by preventing false detections.

Figure 8:
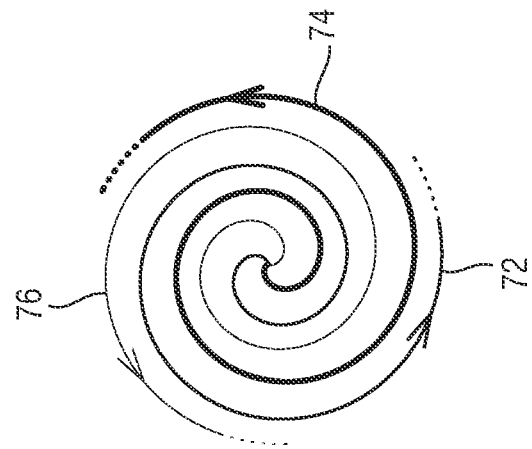
FIG. 8 is also associated with an application of a search for an avalanche victim and illustrates different flight plans over a search sub-zone depending upon the number of drone(s) assigned to search on the sub-zone.
Figure 8:
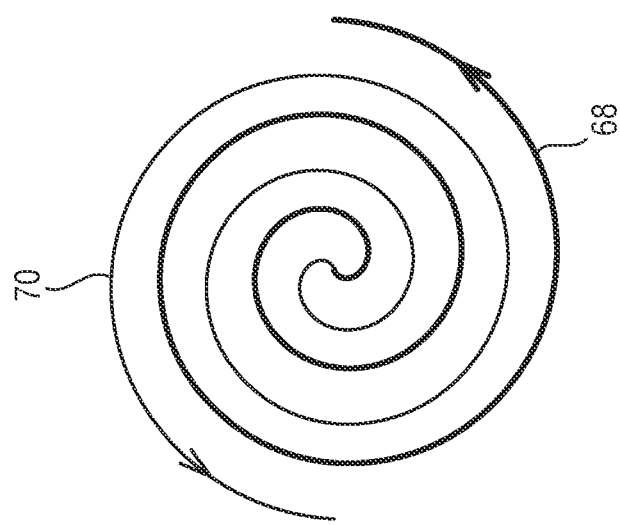
Figure 8:
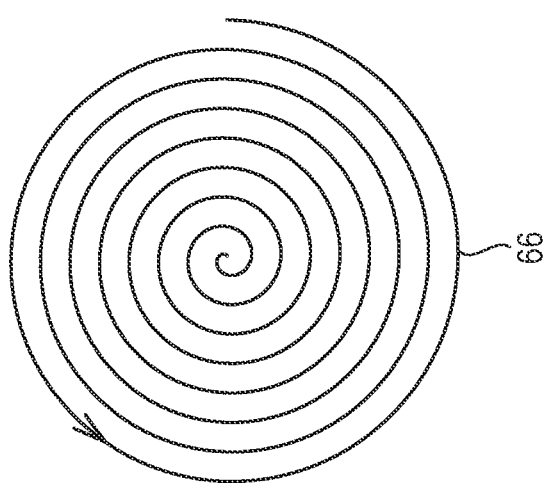

Flight plans associated with such two situations of searching alone or in a patroller team respectively, are illustrated in FIG. 8. Alone, the flying drone 38 shown in FIG. 6 applies e.g. the spiral flight plan of Archimedes 66 with a constant inter-turn distance. When the flying drone 38 shown in FIG. 6 is assisted in precise victim location by the drone 30, the two drones 38 and 30 spiral symmetrically along the corresponding spirals 68 and 70 thereof, moving away from each other in a search circle moving so as to locate the local minimum 64 and the reached maximum 62. When the flying drone 38 shown in FIG. 6 is assisted in precise victim location by two drones, the three drones spiral according to the corresponding spirals 72, 76, 74, etc. thereof.

Once the source of the signal has been detected, the position of the DVA or RECCO® source worn by the victim, is communicated by the flying drone 38 or by the assistant drones thereof, such as the drone 30, to the other patrollers (flying drone or ground patroller equipped with the electronic equipment E called AVDALD for such application of a search for an avalanche victim). The assistant patrollers return to the last position thereof on the sub-zone thereof. Advantageously, the source of the signal of the victim is marked on the ground by a colored aerosol sprayed by the patroller having detected the source, e.g. the flying drone 38 which in such case also carries a colored aerosol.

Figure 9:
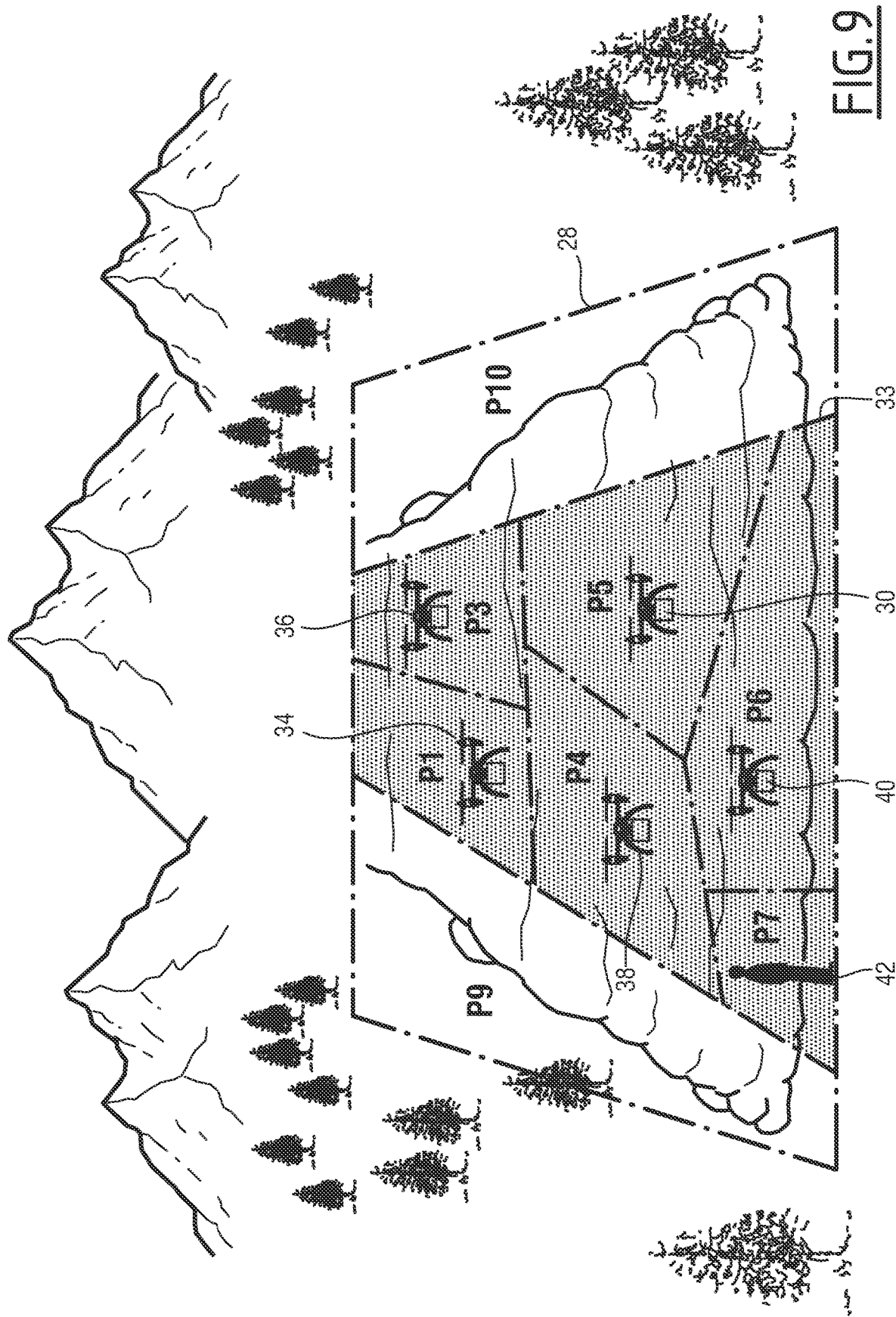
FIG. 9 is also associated with an application of a search for an avalanche victim and illustrates a reconfiguration of the search sub-zones.

FIG. 9 illustrates a reconfiguration of the search subzones, particularly in the event of a patroller no-show. In particular, a withdrawing patroller is detected in different ways, namely in the case of absence during the counting, performed by every patroller, of the number of participants in the exchanges during the communication steps 26 and comparison with the last number of participants associated with the previous communication step 26, if an abandonment role is indicated by the withdrawing patroller.

In the presence of such no-show, the coordination patroller 30 reorganizes the sub-zones in real time so as to continue the search over the entire avalanche zone based on a shortest path algorithm, the current position of the patrollers, the zone already covered by the patrollers, with the aim of applying a minimum of change in the assigned zones so as to avoid a too long reconfiguration before resuming the search.

Once the reconfiguration is performed, the coordination patroller 30 transmits the new flight/route plans to the different patrollers. Thus, in comparison with the assignment shown in FIG. 6 where a sub-zone P1 was assigned to drone 34, a sub-zone P2 was assigned to the drone 35, and a sub-zone P3 to drone 36, in the presence of a no-show of the drone 35, in FIG. 9, the coordination drone 30 increases the sub-zone P1 so as to comprise a part of the sub-zone P2 shown in FIG. 6, and increases the sub-zone P3 so as to comprise the supplementary part of the sub-zone P2 shown in FIG. 6. In other words, in FIG. 9, the sub-zone P2 initially assigned to the withdrawing drone 35 is deleted and distributed between the sub-zones P1 and P3 the search of which is taken over by the drones P1 and P3 respectively.

When the coordination patroller, e.g. the drone 30, is withdrawing, the patroller with the best transmission topology takes the status.

In general, a reconfiguration is implemented within at least one electronic patroller equipment (flying drone or ground patroller) in the event of a change of search sub-zone, assistance to another patroller, implementation of an assisted search to at least one other patroller, no-show of at least one patroller, change of coordination patroller.

The present invention can thus be used for an optimized search, without human intervention at the patroller drones acting in full autonomy and in real time, improving the distribution of the responsibilities per patroller and eventually suitable for reducing the number of patrollers required over the predetermined search zone.

The invention claimed is:

1. A method for assisting in a location of at least one element engulfed within a predetermined search zone, the method being implemented by a location assistance system comprising at least a plurality of patrollers, at least a first patroller corresponding to a drone, the method comprising at least steps of:
   arrival of at least said drone at the predetermined search zone,
   determining a topography of the predetermined search zone, by at least said drone,
   dividing—by at least said drone—the predetermined search zone into search sub-zones according to topography and search capabilities of each patroller of the location assistance system, and assigning each search sub-zone to at least one patroller of the location assistance system,
   searching for said at least one element engulfed through every search sub-zone, by the at least one patroller assigned to said sub-zone,
   periodic inter-patroller communication at least until said at least one engulfed element is located, and
   wherein an assignment of search sub-zone(s) is configured to be reconfigured in real time according to a current status of every patroller of said plurality.

2. The method according to claim 1, wherein the drone implementing the determination of the topography is a drone which is at least temporarily dedicated to a coordination of the search and corresponds to a predetermined drone of said plurality of patrollers, to the drone having a best topology of data transmission toward each of the other patrollers, or further to a first drone to arrive at said predetermined search zone.

3. The method according to claim 2, wherein the drone which is at least temporarily dedicated to the coordination of the search, is configured to share a processing of the determination of the topography with other drones of the plurality of patrollers, having also arrived the predetermined search zone and carrying at least one lidar.

4. The method according to claim 3, wherein the drone which is at least temporarily dedicated to the coordination of the search, determines, from the topography, regions of the predetermined search zone having a radio coverage below a predetermined threshold, and according to said regions, determines a location of relay patroller(s) of said plurality of patrollers, a relay patroller participating in maximizing the radio coverage over an entire predetermined search zone.

5. The method according to claim 3, wherein each search sub-zone is associated with a route plan of said sub-zone, each route plan being based on a calculation of a shortest path for covering the associated sub-zone depending upon at least one element belonging to the group comprising at least:
   capabilities of the patroller to which said sub-zone is assigned,
   a type of detector carried by said patroller,
   the topology of a terrain,
   a current aerology.

6. The method according to claim 3, the plurality of patrollers further comprising at least one second patroller corresponding to an operator carrying electronic equipment, the electronic equipment comprising at least one display and manual entry module and being configured to communicate with every patroller of said plurality of patrollers and to detect said at least one engulfed element, and wherein a calculation, associated with a division into sub-zones and the assignment thereof, is configured to be distributed by the drone at least temporarily dedicated to the coordination of search, between a set of drones belonging to the plurality of patrollers and said at least one electronic equipment.

7. The method according to claim 3, wherein a predetermined probability of successful location of said at least one engulfed element is associated with every sub-zone according to at least one element belonging to the group comprising:
   a nature of the engulfed element, and
   the topology of an environment of the predetermined search zone suitable for covering said engulfed element, the search being prioritized in the sub-zone(s) associated with a highest probability.

8. The method according to claim 2, wherein the drone which is at least temporarily dedicated to the coordination of the search, determines, from the topography, regions of the predetermined search zone having a radio coverage below a predetermined threshold, and according to said regions, determines a location of relay patroller(s) of said plurality of patrollers, a relay patroller participating in maximizing the radio coverage over an entire predetermined search zone.

9. The method according to claim 8, wherein each search sub-zone is associated with a route plan of said sub-zone, each route plan being based on a calculation of a shortest path for covering the associated sub-zone depending upon at least one element belonging to the group comprising at least:
   capabilities of the patroller to which said sub-zone is assigned, a type of detector carried by said patroller,
the topology of a terrain,
a current aerology.

10. The method according to claim 8, the plurality of patrollers further comprising at least one second patroller corresponding to an operator carrying electronic equipment, the electronic equipment comprising at least one display and manual entry module and being configured to communicate with every patroller of said plurality of patrollers and to detect said at least one engulfed element, and wherein a calculation, associated with a division into sub-zones and the assignment thereof, is configured to be distributed by the drone at least temporarily dedicated to the coordination of search, between a set of drones belonging to the plurality of patrollers and said at least one electronic equipment.

11. The method according to claim 8, wherein a predetermined probability of successful location of said at least one engulfed element is associated with every sub-zone according to at least one element belonging to the group comprising:
   a nature of the engulfed element, and
   the topology of an environment of the predetermined search zone suitable for covering said engulfed element, the search being prioritized in the sub-zone(s) associated with a highest probability.

12. The method according to claim 2, the plurality of patrollers further comprising at least one second patroller corresponding to an operator carrying electronic equipment, the electronic equipment comprising at least one display and manual entry module and being configured to communicate with every patroller of said plurality of patrollers and to detect said at least one engulfed element, and wherein a calculation, associated with a division into sub-zones and the assignment thereof, is configured to be distributed by the drone at least temporarily dedicated to the coordination of search, between a set of drones belonging to the plurality of patrollers and said at least one electronic equipment.

13. The method according to claim 2, wherein each search sub-zone is associated with a route plan of said sub-zone, each route plan being based on a calculation of a shortest path for covering the associated sub-zone depending upon at least one element belonging to the group comprising at least:
   capabilities of the patroller to which said sub-zone is assigned,
   a type of detector carried by said patroller,
   the topology of a terrain,
   a current aerology.

14. The method according to claim 2, wherein a predetermined probability of successful location of said at least one engulfed element is associated with every sub-zone according to at least one element belonging to the group comprising:
   a nature of the engulfed element, and
   the topology of an environment of the predetermined search zone suitable for covering said engulfed element, the search being prioritized in the sub-zone(s) associated with a highest probability.

15. The method according to claim 1, wherein each search sub-zone is associated with a route plan of said sub-zone, each route plan being based on a calculation of a shortest path for covering the associated sub-zone depending upon at least one element belonging to the group comprising at least:
   capabilities of the patroller to which said sub-zone is assigned,
   a type of detector carried by said patroller,
   the topology of a terrain,
   a current aerology.

16. The method according to claim 15, the plurality of patrollers further comprising at least one second patroller corresponding to an operator carrying electronic equipment, the electronic equipment comprising at least one display and manual entry module and being configured to communicate with every patroller of said plurality of patrollers and to detect said at least one engulfed element, and wherein a calculation, associated with a division into sub-zones and the assignment thereof, is configured to be distributed by the drone at least temporarily dedicated to the coordination of search, between a set of drones belonging to the plurality of patrollers and said at least one electronic equipment.

17. The method according to claim 1, wherein a predetermined probability of successful location of said at least one engulfed element is associated with every sub-zone according to at least one element belonging to a group comprising:
   a nature of the engulfed element, and
   the topology of an environment of the predetermined search zone suitable for covering said engulfed element,
   the search being prioritized in the sub-zone(s) associated with a highest probability.

18. A system for assisting in a location of at least one engulfed element within a predetermined search zone, the system comprising at least a plurality of patrollers, at least one first patroller corresponding to a drone configured for:
   arriving at the predetermined search zone,
   determining a topography of the predetermined search zone,
   dividing the predetermined search zone into search sub-zones depending upon the topography and upon search capabilities of every patroller of the location assistance system, and assigning every search sub-zone to at least one patroller of the location assistance system,
   every patroller of the location assistance system being configured to:
   search for the at least one engulfed element across every search sub-zone assigned to the patroller,
   communicating periodically with the plurality of patrollers at least until the at least one engulfed element is located, and
   wherein the assignment an search sub-zone(s) is configured to be reconfigured in real time according to a current status of every patroller of said plurality.

19. An electronic equipment for assisting in a location of at least one element engulfed within a predetermined search zone, said equipment being suitable for being used within the location assistance system according to claim 18 comprising at least a plurality of patrollers, the electronic equipment comprising at least:
   a communication module configured for communicating periodically with the plurality of patrollers,
   a search module configured for detecting said at least one engulfed element,
   a display and manual entry module configured for displaying at least of a group consisting of a current search status, a search route assigned to the patroller and for entering at least one request, and status of said patroller, and
   wherein the assignment of search sub-zone(s) is configured to be reconfigured in real time according to a current status of every patroller of said plurality.

* * * * *